US011769038B2

(12) United States Patent
Hultgren et al.

(10) Patent No.: US 11,769,038 B2
(45) Date of Patent: Sep. 26, 2023

(54) CONTEXTUALLY OPTIMIZING ROUTINGS FOR INTERACTIONS

(71) Applicant: Optum, Inc., Minnetonka, MN (US)

(72) Inventors: Jesse Hultgren, Eden Prairie, MN (US); Damian Kelly, Kildare (IE)

(73) Assignee: Optum, Inc., Minnetonka, MN (US)

( * ) Notice: Subject to any disclaimer, the term of this patent is extended or adjusted under 35 U.S.C. 154(b) by 1038 days.

(21) Appl. No.: 16/382,343

(22) Filed: Apr. 12, 2019

(65) Prior Publication Data

US 2020/0327394 A1    Oct. 15, 2020

(51) Int. Cl.
*G06F 3/00* (2006.01)
*G06N 3/044* (2023.01)
*G06F 16/9032* (2019.01)
*G06F 9/48* (2006.01)
*G06F 9/54* (2006.01)

(52) U.S. Cl.
CPC ........... *G06N 3/044* (2023.01); *G06F 9/4881* (2013.01); *G06F 9/546* (2013.01); *G06F 16/90332* (2019.01)

(58) Field of Classification Search
CPC .............................. G06N 3/0445; G06F 9/546
USPC ............................................. 706/15; 719/310
See application file for complete search history.

(56) References Cited

U.S. PATENT DOCUMENTS

| | | |
|---|---|---|
| 7,092,888 B1 | 8/2006 | McCarthy et al. |
| 7,742,591 B2 | 6/2010 | Paek et al. |
| 8,842,812 B2 | 9/2014 | Sarkar et al. |
| 9,477,752 B1 | 10/2016 | Romano |
| 9,620,110 B2 | 4/2017 | Duta et al. |
| 9,645,914 B1* | 5/2017 | Zhang ........................ G06F 8/65 |
| 10,616,369 B1* | 4/2020 | d'Andrea ................ G06N 20/20 |
| 11,238,075 B1* | 2/2022 | Hansen ................ G06F 16/3329 |
| 2007/0005800 A1* | 1/2007 | Banks ................... H04L 67/322 |
| | | 709/238 |

(Continued)

FOREIGN PATENT DOCUMENTS

| | | | | |
|---|---|---|---|---|
| CA | 3014377 A1 | 2/2019 | | |
| CN | 106446265 A | * 2/2017 | ......... | G06F 16/3329 |

OTHER PUBLICATIONS

Cecilia Ovesdotter Alm, Emotions from text: machine learning for text-based emotion prediction. (Year: 2005).*

(Continued)

*Primary Examiner* — Lechi Truong
(74) *Attorney, Agent, or Firm* — Alston & Bird LLP

(57) ABSTRACT

Methods, apparatus, systems, computing devices, computing entities, and/or the like for contextually optimizing routings for interactions. This may include receiving an interaction, wherein the interaction is selected from the group consisting of a voice-based interaction and a textual-based interaction; receiving an interaction problem statement for the interaction; generating, based at least in part on the interaction problem statement, an interaction problem statement summary, wherein the interaction problem statement comprises the context of the interaction; identifying one or more features for the interaction, wherein the features are input for one or more machine learning models; predicting an optimal route for the interaction, wherein the optimality of each route, hence, the optimal route is determined by the one or more machine learning models; and routing the interaction to the optimal route.

21 Claims, 7 Drawing Sheets

(56) References Cited

U.S. PATENT DOCUMENTS

| | | | | |
|---|---|---|---|---|
| 2013/0179260 | A1* | 7/2013 | Keohane | G06Q 30/06 |
| | | | | 705/26.1 |
| 2016/0352907 | A1 | 12/2016 | Raanani et al. | |
| 2018/0300198 | A1* | 10/2018 | Symington | G06F 11/0709 |
| 2018/0301121 | A1* | 10/2018 | Kim | H04N 21/4312 |
| 2019/0087179 | A1* | 3/2019 | Velayudham | G06F 8/71 |
| 2019/0130304 | A1* | 5/2019 | Gupta | G06F 16/334 |
| 2019/0303258 | A1* | 10/2019 | Kumar | G06F 11/3495 |
| 2021/0272128 | A1* | 9/2021 | Slawson | G06F 40/169 |

OTHER PUBLICATIONS

Jerry Alan Fails, Interactive Machine Learning. (Year: 2003).*
A. D. Birrell, A Universal File Server. (Year: 1980).*
S.K.M. Wong, a Machine Learning Approach To Information Retrieval. (Year: 1986).*
International Searching Authority, International Search Report and Written Opinion for International Application No. PCT/US2020/027587, dated Jul. 9, 2020, (9 pages), Rijswijk, Netherlands.
"Route Interactions In Real Time With I" Genesys, (8 pages), (online), Available on the Internet genesys.com/capabilities/automated-routing.
Kelly, Brent. "Afiniti Taps AI to Optimize Customer-Agent Pairing," No Jitter, (5 pages), Dec. 18, 2017, (article, online), [Retrieved from the Internet Oct. 13, 2021] <URL: nojitter.com/afiniti-taps-ai-optimize-customer-agent-pairing>.
Napoles, Courtney et al. "Annotated English Gigaword," Linguistic Data Consortium, (2 pages), Nov. 15, 2012, (online), [Retrieved from the Internet Oct. 13, 2021] <URL: https://catalog.ldc.upenn.edu/LDC2012T21>.
"How Omnichannel Routing Enables Seamless Customer Experiences," (2017), Genesys—White Paper, pp. 1-7.
Nallapati et al., "Abstractive Text Summarization Using Sequence-to-Sequence RNNs and Beyond," Proceedings of the 20th SIGNLL Conference on Computational Natural Language Learning (CoNLL), Aug. 7-12, 2016, pp. 280-290, Berlin, Germany.
Saama Executives, "Smarter Contact Centers With Machine Learning," (2019), Saama Technologies, Inc., [retrieved from the Internet Jul. 11, 2019] <URL: saama.com/blog/smarter-contact-centers-machine-learning/> (7 pages).
Wathne, "A Simple Way Machine Learning Is Improving IVR In Contact Centers," (2019), LinkedIn, [retrieved from the Internet Jul. 11, 2011]<URL: linkedin.com/pulse/simple-way-machine-learning-improving-ivr-contact-centers-wathne/>.

* cited by examiner

CONTEXTUALLY OPTIMIZING ROUTINGS FOR INTERACTIONS

BACKGROUND

Current user interaction platforms (e.g., interactive voice response (IVR) systems), virtual assistant systems, and chatbot systems) have many deficiencies, such as inefficient routing of interactions. Such routing inefficiencies are magnified as interaction volumes and complexities increase. For example, an IVR system may have hundreds of potential routes and outcomes for interactions that force a user to navigate the complexity; such experiences are often difficult and time-consuming for users. Additionally, routing errors for interactions can cost an enterprise significantly.

Through applied effort and ingenuity, various embodiments satisfy the above-mentioned needs as discussed in greater detail herein.

BRIEF SUMMARY

In general, embodiments of the present invention provide methods, apparatus, systems, computing devices, computing entities, and/or the like.

In accordance with one aspect, a method is provided. In one embodiment, the method comprises receiving, via one or more processors, an interaction, wherein the interaction is selected from the group consisting of a voice-based interaction and a textual-based interaction; receiving, via the one or more processors, an interaction problem statement for the interaction; generating, via the one or more processors and based at least in part on the interaction problem statement, an interaction problem statement summary, wherein the interaction problem statement comprises the context of the interaction; identifying, via the one or more processors, one or more features for the interaction, wherein the features are input for one or more machine learning models; predicting, via the one or more processors, an optimal route for the interaction, wherein the optimal route is determined by the one or more machine learning models; and routing, via the one or more processors, the interaction to the optimal route.

In accordance with another aspect, a computer program product is provided. The computer program product may comprise at least one computer-readable storage medium having computer-readable program code portions stored therein, the computer-readable program code portions comprising executable portions configured to receive an interaction, wherein the interaction is selected from the group consisting of a voice-based interaction and a textual-based interaction; receive an interaction problem statement for the interaction; generate, based at least in part on the interaction problem statement, an interaction problem statement summary, wherein the interaction problem statement comprises the context of the interaction; identify one or more features for the interaction, wherein the features are input for one or more machine learning models; predict an optimal route for the interaction, wherein the optimal route is determined by the one or more machine learning models; and route the interaction to the optimal route.

In accordance with yet another aspect, a computing system comprising at least one processor and at least one memory including computer program code is provided. In one embodiment, the at least one memory and the computer program code may be configured to, with the processor, cause the computing system to receive an interaction, wherein the interaction is selected from the group consisting of a voice-based interaction and a textual-based interaction; receive an interaction problem statement for the interaction; generate, based at least in part on the interaction problem statement, an interaction problem statement summary, wherein the interaction problem statement comprises the context of the interaction; identify one or more features for the interaction, wherein the features are input for one or more machine learning models; predict an optimal route for the interaction, wherein the optimal route is determined by the one or more machine learning models; and route the interaction to the optimal route.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

Figure 1:
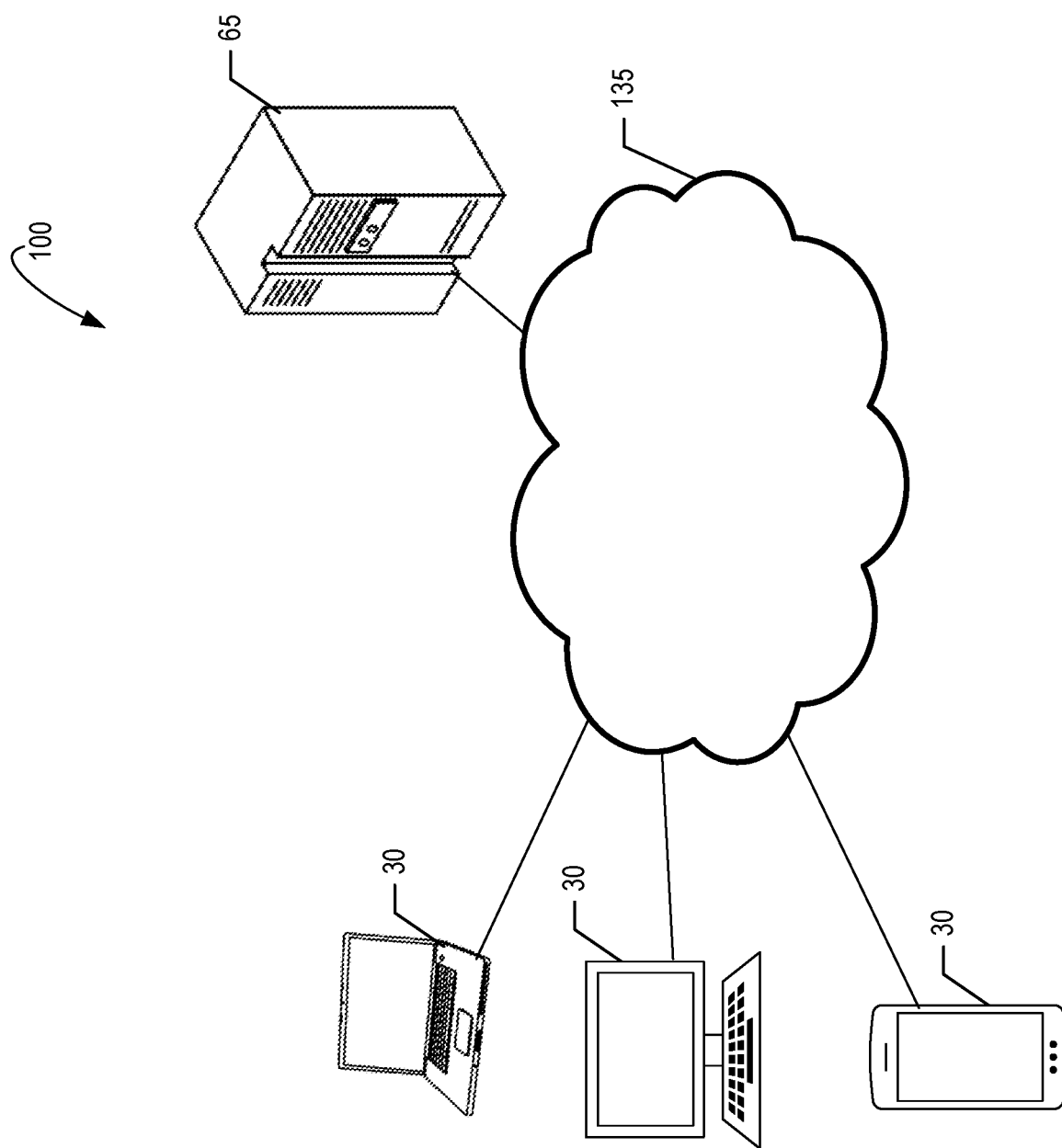
FIG. 1 is a diagram of an exemplary interaction platform that can be used in conjunction with various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an interaction platform 100 that can be used in conjunction with various embodiments of the present invention. As shown in FIG. 1, the interaction platform 100 may comprise one or more interaction server systems 65, one or more user computing entities 30, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary Interaction Server System

Figure 2:
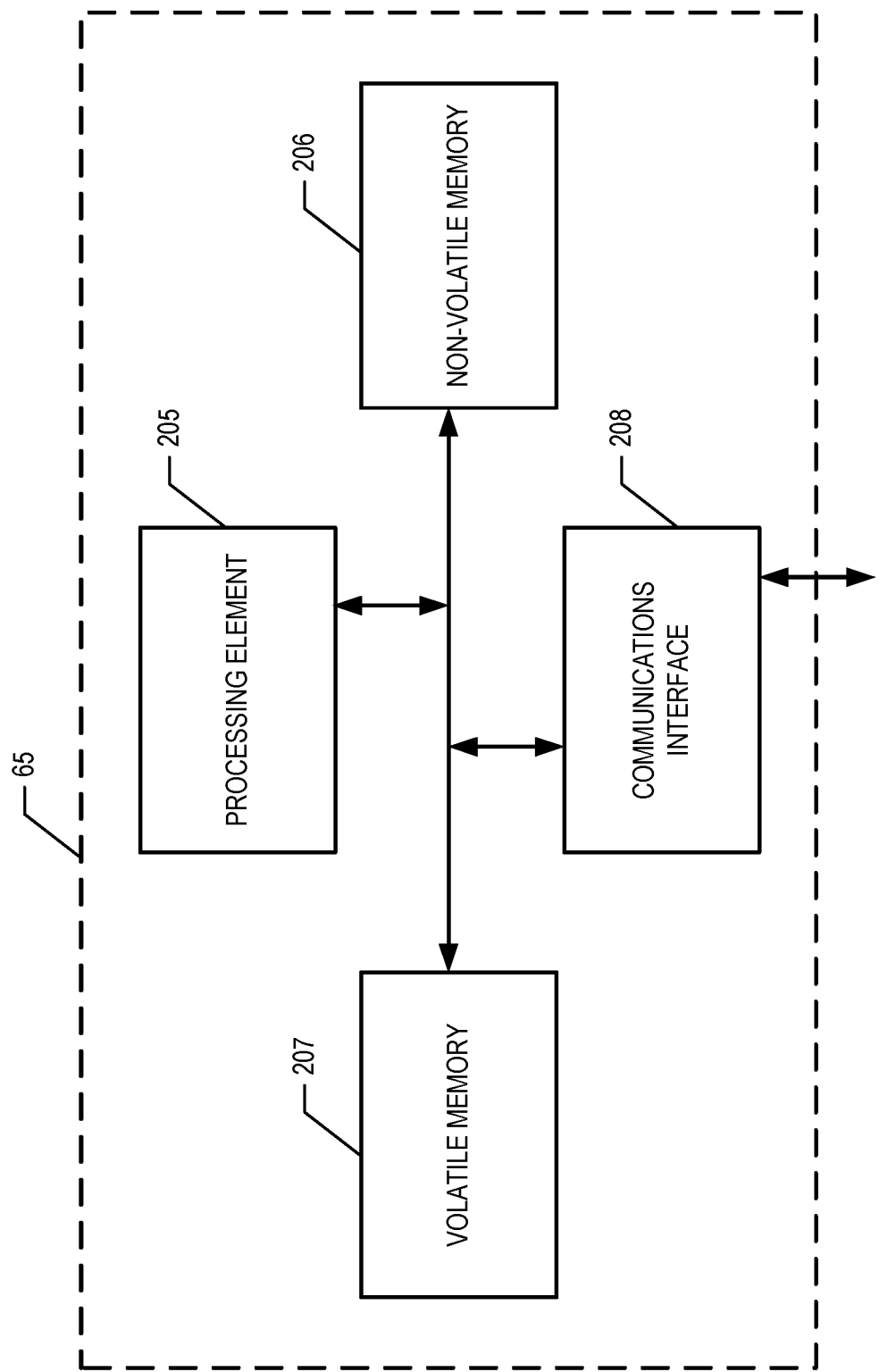
FIG. 2 is a schematic of an exemplary interaction server system in accordance with certain embodiments of the present invention.

FIG. 2 provides a schematic of an exemplary interaction server system 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the interaction server system 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the interaction server system 65 may communicate with other computing entities, one or more user computing entities 30, and/or the like.

As shown in FIG. 2, in one embodiment, the interaction server system 65 may include or be in communication with one or more processing elements 205 (also referred to as processors, processing circuitry, and/or similar terms used herein interchangeably) that communicate with other elements within the interaction server system 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the interaction server system 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the interaction system may be stored. As a person of ordinary skill in the art would recognize, the information/data required for the operation of the interaction system may also be partially stored in the cloud data storage system and partially stored in a locally maintained data storage system.

Memory media 206 may include information/data accessed and stored by the interaction system to facilitate the operations of the system. More specifically, memory media 206 may encompass one or more data stores configured to store information/data usable in certain embodiments.

In one embodiment, the interaction server system 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the interaction server system 65 with the assistance of the processing element 205 and operating system.

As indicated, in one embodiment, the interaction server system 65 may also include one or more network and/or communications interfaces 208 (e.g., for messages, for voice calls, for chats, and/or the like) for communicating with various computing entities, such as by communicating data, content, information, and/or similar terms used herein interchangeably that can be transmitted, received, operated on, processed, displayed, stored, and/or the like. For instance, the interaction server system 65 may communicate with computing entities or communication interfaces of other computing entities, user computing entities 30, and/or the like.

As indicated, in one embodiment, the interaction server system 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, s as fiber distributed data interface (FDDI), digital subscriber line (DSL), Ethernet, asynchronous transfer mode (ATM), frame relay, data over cable service interface specification (DOCSIS), or any other wired transmission protocol. Similarly, the interaction server system 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The interaction server system 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the interaction server's components may be located remotely from other interaction server system 65 components, such as in a distributed system. Furthermore, one or more of the components may be aggregated and additional components performing functions described herein may be included in the interaction server system 65. Thus, the interaction server system 65 can be adapted to accommodate a variety of needs and circumstances.

b. Exemplary User Computing Entity

Figure 3:
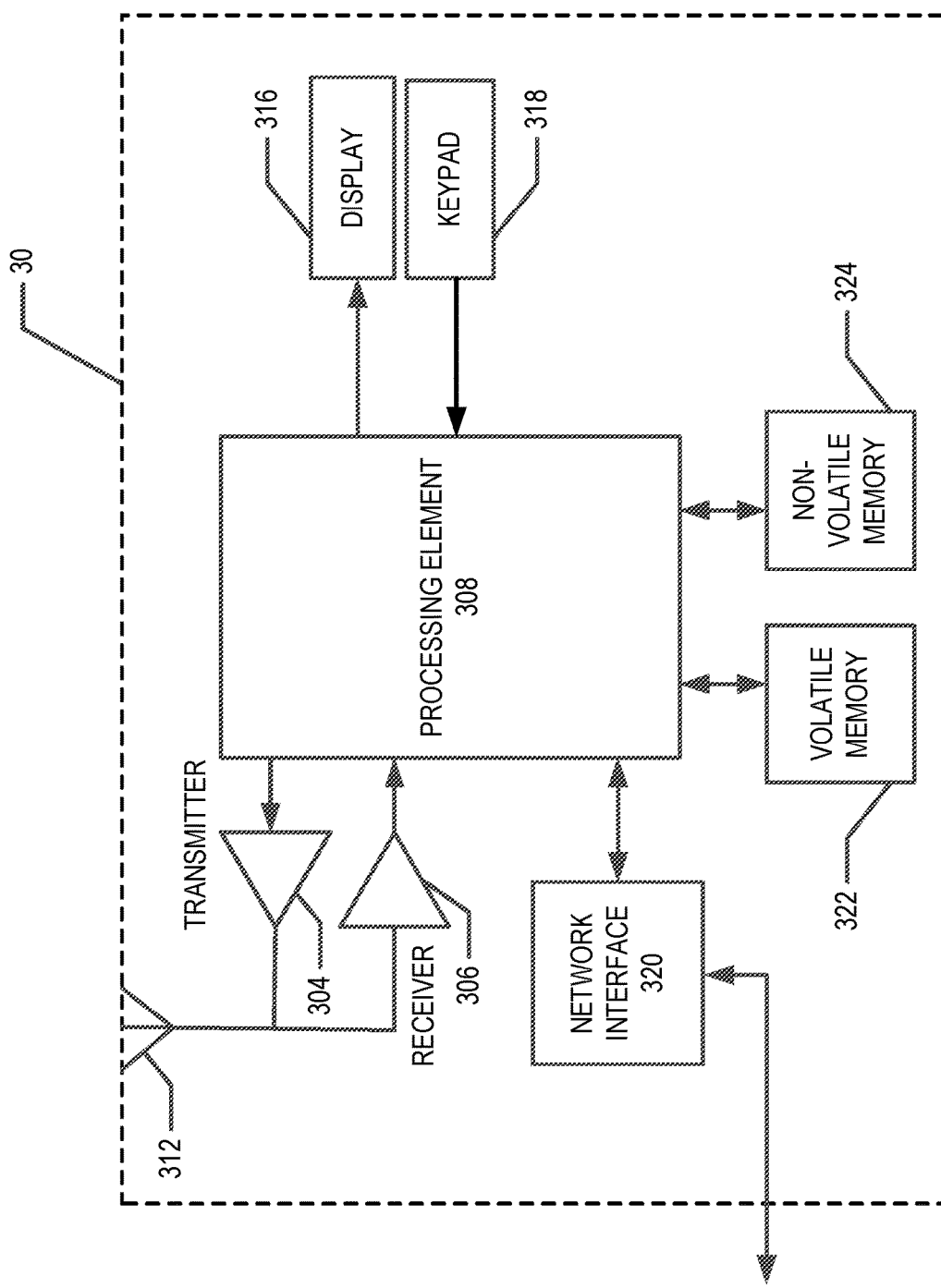
FIG. 3 is a schematic of an exemplary user computing entity in accordance with certain embodiments of the present invention.

FIG. 3 provides an illustrative schematic representative of user computing entity 30 that can be used in conjunction with embodiments of the present invention. As will be recognized, the user computing entity may be operated by an agent and include components and features similar to those described in conjunction with the interaction server system 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as an interaction server system 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MIMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the interaction server system 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. Exemplary System Operation

Figure 4:
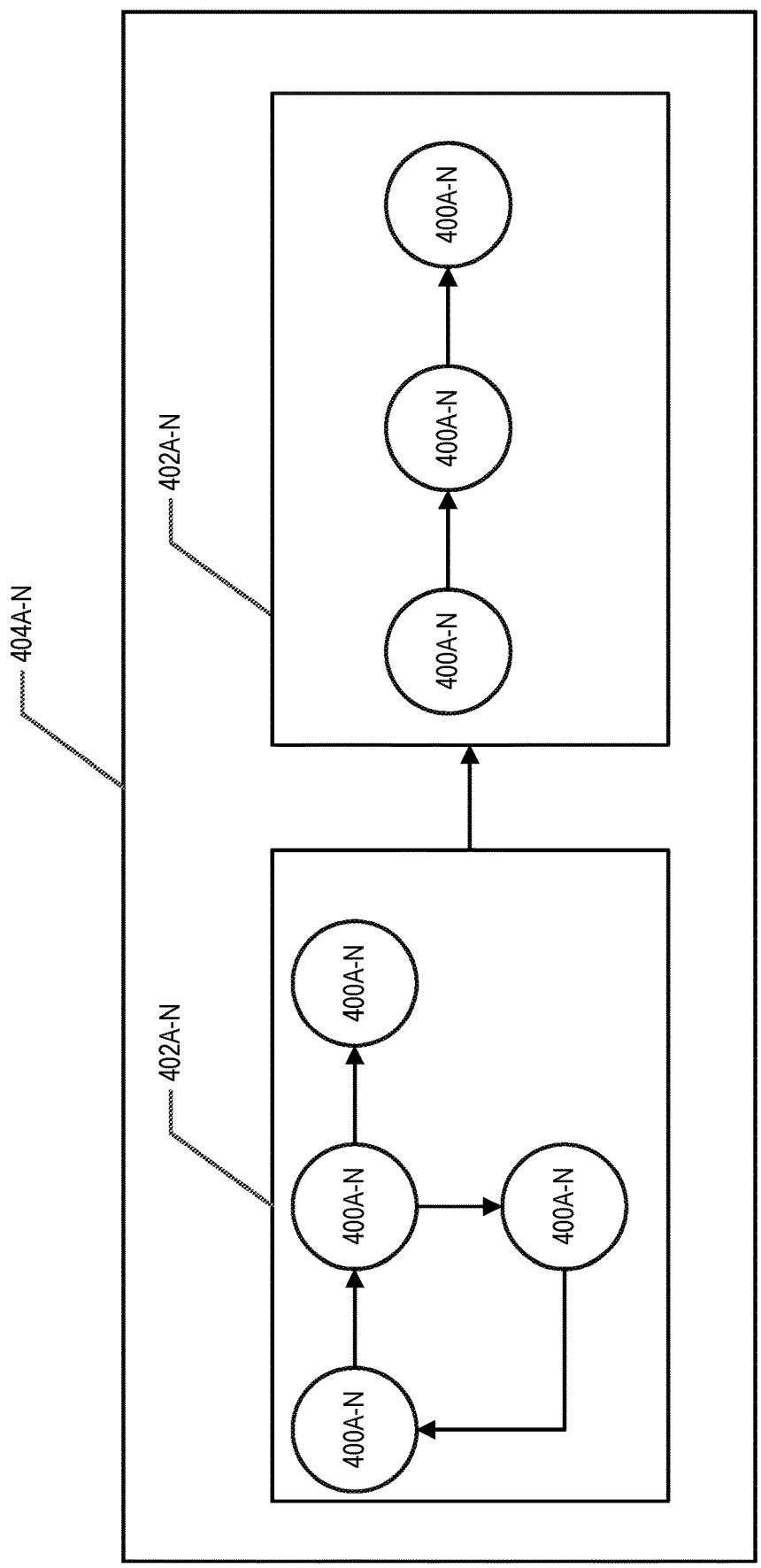
FIG. 4 shows exemplary nodes, exemplary node groups, an exemplary set of a node group, and an exemplary interaction flow in accordance with certain embodiments of the present invention.
Figure 5A:
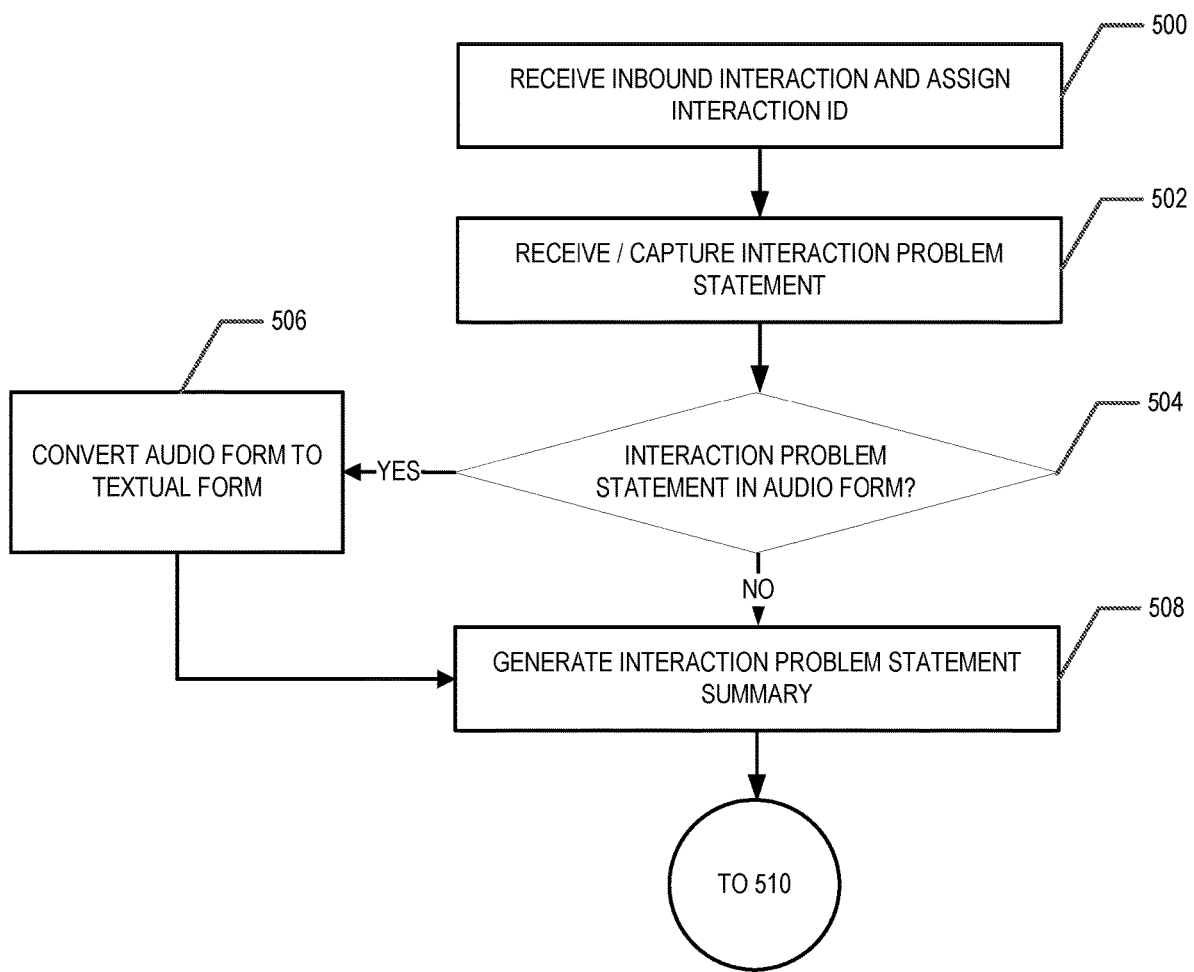
FIGS. 5A and 5B show exemplary flow charts in accordance with certain embodiments of the present invention.
Figure 5B:
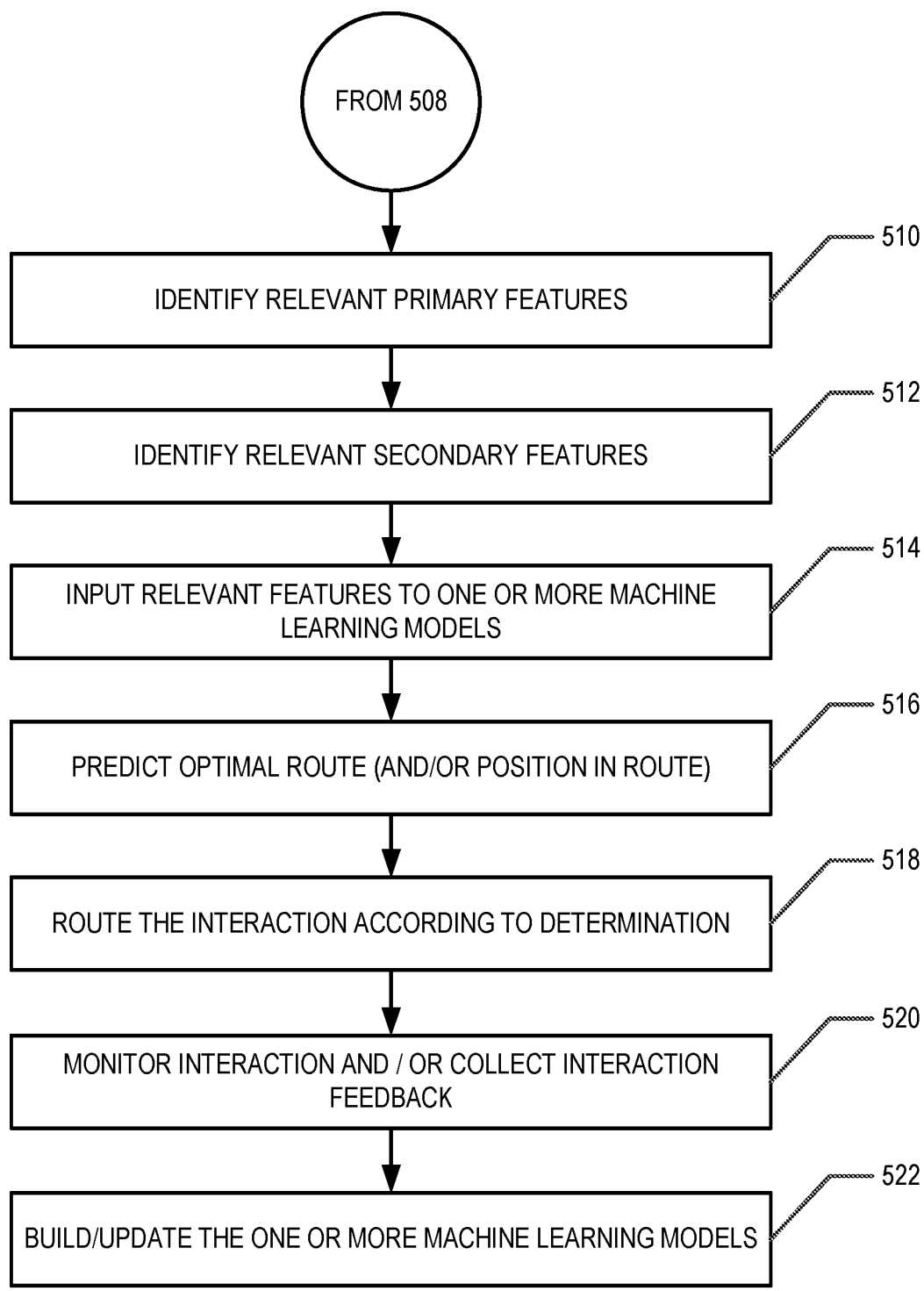
Figure 6:
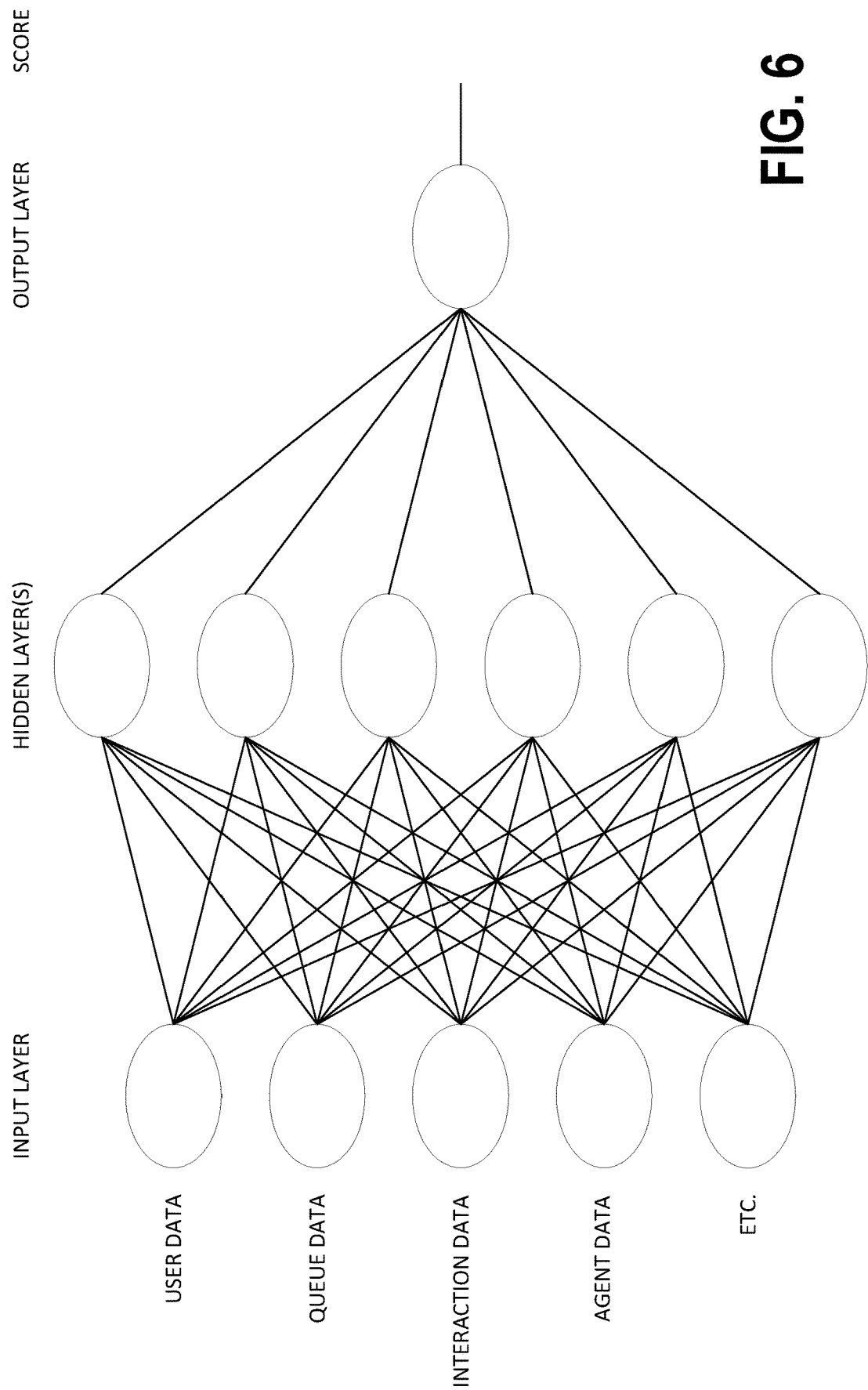
FIG. 6 show an exemplary neural network in accordance with certain embodiments of the present invention.

Reference will now be made to FIGS. 1, 2, 3, 4, 5A, 5B, and 6. FIG. 1 is a diagram of an exemplary interaction platform. FIG. 2 is a schematic of an exemplary interaction server system. FIG. 3 is a schematic of an exemplary user computing entity. FIG. 4 shows exemplary nodes, exemplary node groups, an exemplary grouping of a node group, and an exemplary interaction flow in accordance with certain embodiments of the present invention. FIGS. 5A and 5B show exemplary flow charts in accordance with certain embodiments of the present invention. FIG. 6 show an exemplary neural network in accordance with certain embodiments of the present invention.

a. Technical Problems

As will be recognized, current solutions for optimizing the routing of interactions are inefficient and manual in nature. The following provides examples of some of the current inefficient and manual interactions.

"Press" or "say" type promptings (e.g., pressing or speaking inputs) can remove user confusion by informing users about the available options. However, users must typically must listen to all of the same prompts regardless of the reason(s) for their interaction. Similarly, improper or misunderstood inputs may result in internal interaction transfers.

With the natural language processing (NLP) promptings, the complexity of prompts can be reduced (e.g., "Tell me in a few words the reason for your call today."). After receiving the input, NLP systems needs natural language tags searching for specific keywords that match routing destinations. Technically, when more than one keyword is mentioned, it can confuse the system and result in an improper routing. Further, the user may something that is not understandable by the system.

Conversation manager promptings search for active campaigns that have been manually created. For example, if a user has recently called about a particular issue (e.g., a claim issue), the user may be identified in a repeat user campaign and be provided with a customized prompt (e.g., "I see you called yesterday about a claim, is that why you are calling?"). Thus, conversation manager can help avoid the complex routing, such as in IVR systems, when a user is calling again for the same issue. Unfortunately, active campaigns require manual configuration, don't capture other reasons for the interaction, and don't provide contextual information to live agents.

Through applied effort and ingenuity, various embodiments overcome these technical challenges using various technical solutions.

b. Technical Solutions

To overcome at least the above-identified technical challenges, embodiments of the present invention provide technical solutions for efficient routing of interactions. For example, embodiments of the presentation invention automatically determine the intent of a user's interaction without forcing the user to answer a cumbersome series of questions. Then, embodiments of the present invention provide accurate, automated, and efficient routing of interactions using artificial intelligence technologies.

Embodiments of the present invention provide for a technical solution for contextually optimizing the routing of interactions. This innovative approach includes capturing one or more problem statements that are driving the interaction. In one example, a user may provide an interaction problem statement audibly to an IVR system or a virtual assistant (e.g., Alexa, Google Home, and/or the like). In another example, a user may submit a text-based problem statement via a chat with a chatbot or an email message through an email system. After capturing the interaction problem statement, the interaction platform 100 processes the interaction problem statement to generate an interaction problem statement summary. The interaction problem statement summary identifies the "intent" of the user for the interaction. For example, the interaction problem statement summary may comprise keywords, a category, a vector representation corresponding to the interaction problem statement, and/or the like. With the interaction problem statement and the corresponding problem statement summary, inputs can be provided to one or more machine learning models that determine/identify an optimal routing for the interaction. The interaction may be to a live agent or to one or more automated interaction flows. In certain embodiments, routing the interaction to a live agent may include providing the interaction problem statement and the interaction problem statement summary to live agent for context in managing and handling the interaction. The interaction can then be monitored to update the one or more machine learning models.

c. Interactions

In one embodiment, an inbound interaction is received by the interaction server system 65 (step/operation 500 of FIG. 5A) and is assigned an interaction identifier (ID). An interaction may be a voice call (e.g., voice-based interaction), a chat with a chatbot (e.g., textual-based interaction), a conversation with a virtual assistant (e.g., voice-based interaction), and/or the like. These types of interactions can be handled and/or routed using a variety of techniques and approaches. Further, as will be recognized, interactions may be manually handled by the interaction server system 65 in an automated, semi-automated, and/or manual manner. An interaction ID may be a unique identifier assigned to the interaction, such as a UUID or a GUID (e.g., 30d26f7e-4d22-4ab7-96a9-919d5f5919ea). The interaction ID can be used to route the interaction, monitor its progress, and monitor its resolution.

b. 1. Manual Interactions

As indicated, the interaction server system 65 can route an interaction to an interaction queue for manual interaction. An interaction queue may be a virtual queue to which inbound interactions can be assigned for specific departments, categories, subcategories, agents, and/or the like. For example, the interaction server system 65 can route the interaction to an interaction queue of a plurality of interaction queues (or even a specific position within an interaction queue) to be handled by a live agent. For instance, an interaction may be routed an interaction queue for live agents handling a specific department (e.g., billing) or specific type of request within the department (e.g., agreed upon discounts not being received at stores). In such a scenario, the interaction can be provided with an interaction summary using extracted summary interaction information/data.

b. 2. Automated Interactions

In contrast to manual interactions, the interaction server system 65 can route an interaction to an interaction flow for a semi-automated interaction (e.g., part of the interaction is handled in an automated manner) or a fully-automated interaction (e.g., the entire interaction is handled in an automated manner). In one embodiment, semi-automated interactions and fully-automated interactions are handled by interaction flows. Interaction flows may include various nodes 400A-N. A node 400A-N may be an atomic output logic and/or an atomic input logic. For instance, an atomic output logic may play an audio file via an IVR system, playing an audio file via a virtual assistant (e.g., Alexa, Siri, etc.), providing textual output via a chatbot or virtual assistant, and/or the like. An atomic input logic may collect (e.g., receive, capture, and/or similar words used herein interchangeably) information/data responsive to (e.g., after) requests from output logic via voice or textual input, capture an image, collected environmental information/data, and/or the like. In one embodiment, each node 400A-N can be connected to one or more other nodes 400A-N using flows/paths to create interaction flows. An interaction flow comprises one or more nodes 400A-N and one or more flows/paths to and from other nodes 400A-N.

In one embodiment, a node group 402-N comprises two more nodes 400A-N and one or more flows/paths to and from the nodes 400A-N. That is, a node group 402-N stores two or more nodes 400A-N and their corresponding paths/flows. The node group 402-N preserves the nodes 400A-N (with their logic) and their respective flows/paths for the group. A node group 402-N, then, can be a collection of nodes 400A-N in an interaction graph with related functionality or groups themselves forming a hierarchical structure.

In one embodiment, a grouping of node groups 404A-N comprises two more nodes groups 402-N and one or more flows/paths to and from the nodes groups 402-N. That is, a groupings of node groups 404A-N stores two or more nodes groups 402-N and their corresponding paths/flows. A node group 404A-N preserves the node groups 402-N (with their logic) and their respective flows/paths for the group. Correspondingly, a grouping of node groups 404A-N can be a collection of node groups 402-N (and their respective nodes) in an interaction graph with related functionality or groups themselves forming a hierarchical structure.

In one embodiment, the paths/flows to and from nodes 400A-N, to and from nodes node groups 402-N, and/or to and from groupings of node groups 404A-N can be represented as lines between the same.

d. Interaction Problem Statements

In one embodiment, the interaction server system 65 can provide a textual or audible prompt requesting a user to input an interaction problem statement. For example, Table 1 provides four exemplary scenarios for requesting and capturing an interaction problem statement. In example 1, the request is made by a live agent.

TABLE 1

| | |
|---|---|
| Ex. 1: | Live agent asks for an interaction problem statement and the input is recorded. |
| Ex. 2: | IVR system prompts for an interaction problem statement and records the input. |
| Ex. 3: | Digital assistant prompts for an interaction problem statement and records the input. |

TABLE 1-continued

| Ex. 4: | Chatbot prompts for an interaction problem statement and stores the input. |
|---|---|

In an alternative embodiment the natural conversation between an agent and a caller can be transcribed to capture the problem statement. At step/operation 502 of FIG. 5A, the interaction server system 65 can capture or receive the input and store/record the input (e.g., received interaction problem statement). For example, in the audio context, the interaction server system 65 can record and store the interaction problem statement in an audio file. In textual context, the interaction server system 65 store the interaction problem statement as text in a flat file, for example. By way of example, a captured problem statement may be "My employer said that I am supposed to get a 10% discount for over the counter medications. However, each time I checkout at the store, my bill shows the full price." In another example, a captured problem statement may be "I need help finding a provider near me." In yet another example, a capture problem statement may be "I got a letter in the mail, and I am not sure what it means but it says to call this number." In still another example, a captured problem statement may be "I ordered a prescription from your mail order service and I am wondering when I will get it." And in yet still another example, a captured problem statement may be "I am considering couple's counseling and I am wondering what it will cost to see a provider."

At steps/operations 504/506 of FIG. 5A, if the interaction problem statement is in audio form (e.g., stored in an audio file), the interaction server system 65 can transcribe the audio interaction problem statement to a textual interaction problem statement and store the same in a flat file, for example, accessible by users and associated systems. As will be recognized, audio to text can be achieved in a number of ways. For instance, in one embodiment, the interaction server system 65 can retrieve call transcripts from a pre-existing legacy call transcription service to carry out the translation. In another embodiment, the interaction server system 65 can communicate with one or more external or internal third party transcription services—such as CMU Sphinx, IBM's Watson Text to Speech, Google's Cloud Speech API, and/or the like. In yet another embodiment, the interaction server system 65 can implement audio-to-text using various deep learning techniques in which relevant acoustic features are extracted from the audio and used as input for transcription. Such deep learning approaches include fully connected, sequential, convolutional, and/or any combination of such architectures.

e. Interaction Problem Statement Summaries

In one embodiment, at step/operation 508 of FIG. 5B, with the interaction problem statement in textual form, the interaction server system 65 can generate an interaction problem statement summary from the text stored in the file. An interaction problem statement summary comprises a summary and contextual information about a user's issue (reason for the interaction) that allows for intelligent routing decisions to be made based on that summary/context. For example, the interaction server system 65 can retrieve the textual problem statement and apply any of one or more summarization techniques to generate the interaction problem statement summary.

In one embodiment, the interaction server system 65 can implement keyword extraction techniques to generate an interaction problem statement summary for each interaction. The keyword extraction techniques may include applying a Rapid Automatic Keyword Extraction (RAKE) algorithm or Term Frequency-Inverse Document Frequency (TF-IDF) algorithm. The RAKE algorithm is a domain independent keyword extraction algorithm that determines key phrases in text by analyzing the frequency of word appearance and its co-occurrence with other words in the text. The TF-IDF algorithm weighs each term's frequency (TF) and its inverse document frequency (IDF) to generate respective TF and IDF scores. The product of the TF and IDF scores generates the weight of the particular term, which assigns the importance to that term based on the number of times it appears in the document.

In another embodiment, the interaction server system 65 can implement machine learning techniques to generate an interaction problem statement summary for each interaction. In one machine learning example, the interaction server system 65 can implement sequence-to-sequence learning and/or recurrent neural network architecture leveraging various datasets to generate an interaction problem statement summary. In another machine learning example, the interaction server system 65 can implement text-to-category techniques to generate an interaction problem statement summary. In this approach, the interaction server system 65 generates a classification of the category of the interaction given the topics the user has input. Examples of classifications may be policy coverage, payments, coordination of benefits, and/or the like. And in yet another machine learning example, the interaction server system 65 can implement text-to-intent techniques to produce a vector that represents the "intent" of the user for the interaction. The vector may be a non-human interpretable vector that be used as input to determine the optimal route for the interaction.

In another embodiment, the interaction server system 65 may generate an abstractive summarization of the text and the keywords derived from the text as considering both together would provide greater context to an agent for the interaction than either one alone.

In another embodiment, the interaction server system 65 can predict a category for an interaction. For instance, the interaction server system 65 can use NLP machine learning models, trained on relevant text to interaction category information/data, to predict the most likely interaction category given the interaction transcription. Similarly, the interaction transcription information/data can be translated to an indicator more sophisticated than interaction categories—such as "intent." As noted above, the intent can be represented as an intent vector, a thought vector, and similar words used herein interchangeably. Such vectors represent the action that the user was trying to achieve.

As will be recognized, an interaction problem statement summary may be generated from one or any number of summarization techniques. Tables 2-6 below provides an example problem statement and an example problem statement summary.

TABLE 2

Interaction Problem Statement: My employer
said that I am supposed to get a 10% discount
for over the counter medications. However,
each time I checkout at the store, my
bill shows the full price.
Interaction Problem Statement Summary: Contractual
discounts not being received at stores.

TABLE 3

Interaction Problem Statement: I need help finding a provider near me.
Interaction Problem Statement Summary: Provider search.

TABLE 4

Interaction Problem Statement: I got a letter in the mail, and I am not sure what it means but it says to call this number.
Interaction Problem Statement Summary: Payment integrity letter.

TABLE 5

Interaction Problem Statement: I ordered a prescription from your mail order service and I am wondering when I will get it.
Interaction Problem Statement Summary: RX order status.

TABLE 6

Interaction Problem Statement: I am considering couple's counseling and I am wondering what it will cost to see a provider.
Interaction Problem Statement Summary: Inquiry on routine outpatient behavioral health benefits.

In one embodiment, an interaction problem statement summary corresponds to one or more interaction categories and/or interaction subcategories.

f. Features

In one embodiment, at steps/operations 510 and 512 of FIG. 5B, the interaction server system 65 can generate (or extract) features for input to one or more machine learning models. The features may include both primary features and secondary features. It can also use machine learning to generate these features. E.g. using a machine learning classifier to determine the interaction category from the problem statement or using machine learning to generate an intent vector from the problem statement. In one example, the interaction categories and/or interaction subcategories for the interaction may comprise the primary features. In another example, the interaction problem statement summary may comprise one or more primary features that can be extracted, derived, retrieved, obtained, and/or similar words used herein interchangeably. For instance, the interaction server system 65 can extract one or more primary features from the interaction problem statement summary. Continuing with the above example, with an interaction problem statement summary of "contractual discounts not being received at stores," the interaction server system 65 may determine that discount_not_honoured is a primary feature or generate an intent vector that captures this information as a primary feature.

Similar to primary features, secondary features may be extracted using a variety of techniques and approaches. For example, the secondary features may be extracted from user information/data, user profile information/data, interaction information/data, interaction category information/data, interaction subcategory information/data, possible queue information/data, possible agent type information/data, possible interaction flow information/data, and/or the like. As examples of user information/data and/or user profile information/data, the secondary features may include age, residential location, business location, profession, languages spoken, medical history, and/or the like. As examples of interaction information/data, the secondary features may include the type of device being used for the interaction, the form of the interaction (e.g., chat, voice call, virtual assistant conversation, and/or the like), the origin of the interaction, the time of the interaction, the date of the interaction, the season of the interaction, and/or the like. As an example of interaction category information/data and interaction subcategory information/data, the secondary features may information/data associated with category or subcategory. As examples of queue information/data, the secondary features may include the wait times for the interaction queues, historical results of interactions routed to the interaction queues, transfers out of the interaction queues, agent types assigned to the interaction queues, and/or the like. As examples of agent information/data for the different queues under consideration, the secondary features may include the skill of the agents handling each queue, the demographics of the agents handling each queue, the experience of the agents handling each queue, the differences between user and the agents handling each queue (e.g., differences in age, differences in location, differences in first language spoken, differences in second language spoken, and/or the like), and/or the like.

With the primary features and secondary features identified, the interaction server system 65 can format the features for input to the one or more machine learning models. As will be recognized, the features may be represented in a variety of forms—including comma-separated values, tokens, vectors, bitmaps, and/or the like. As will be recognized, a variety of approaches and techniques can be used to adapt to various needs and circumstances.

g. Predicting Optimal Routes Using Machine Learning

In one embodiment, as indicated as step/operation 514 of FIG. 5B, the interaction server system 65 can input the relevant features to one or more machine learning models. For example, FIG. 6 shows a high-level diagram of features being provided to input nodes of an input layer of an artificial neural network. While an artificial neural network is depicted, embodiments of the present invention are not limited to artificial neural networks and can be used with a variety of machine learning approaches and techniques. Exemplary machine learning approaches and techniques include model predictive control, Naïve Bayes, linear discriminant analysis, regularized discriminant analysis, quadratic discriminant analysis, Gaussian mixture models and kernel density estimation, logistic regression, random forests, extreme gradient boosting, deep neural networks, genetic algorithms, particle swarm optimization, simulated annealing, reinforcement learning, grid search methods, and/or the like.

In one embodiment, using the input features, one or more machine learning models can predict (e.g., generate a prediction) for the optimality of each route, given the current interaction features. The optimality may be (a) the likelihood to have a positive outcome, (b) the inverse of the number of nodes for an automated interaction flow, (c) the degree of similarity to a corresponding interaction category, (d) the degree of similarity to a corresponding interaction subcategory, (e) the inverse of the predicted number of transfers, (f) the predicted post-interaction feedback, (g) the inverse of the predicted likelihood of receiving follow-up interactions, and/or the like. With this ability to calculate optimality score for each transfer, the system can calculate the score for each next transfer (e.g. transfer department, agent id, agent skill level, etc.) and choose the next transfer with the highest optimality. This approach applies not just for transfers, but any action which we have control of for a given caller. As will be recognized, one or more machine learning models can use the input features to predict the optimal route (step/operation 516 of FIG. 5B). For example, the output of the one or more machine learning models can be used to output a route with a corresponding optimality score and/or a plurality of routes with respective optimality scores. In one embodiment, this may include generating/predicting an optimality score for each possible route (or next action). Thus, an optimal route (e.g., a route with the highest optimality score) may indicate an interaction queue to which the interaction should be assigned, a position or priority in an interaction queue to which the interaction should be assigned, an interaction flow to which the interaction should be connected; and a node in an interaction flow to which the interaction should be connected, and/or the like. For example, the highest optimality score for an interaction may indicate that it should be routed (e.g., assigned) to a queue for agents with "agent skill 400," to the first position in the "payments" queue, and/or the like. In another embodiment, the one or more machine learning models may indicate a primary optimal route and a secondary optimal route. In such a case, there may be a compound problem statement and problem statement summary—with different destinations (e.g., medical claims and RX mail order status). In this example, the one or more machine learning models may determine whether there are any agents available with the skills to answer both questions, and if not, determine the optimal route A then B, or B then A based on for example, estimated wait times of the phone queues, complexity of issues, urgency, and/or the like. As will be recognized, a variety of different approaches and techniques can be used to adapt to various needs and circumstances.

h. Routing Interactions

In one embodiment, with a predicted optimal route, the interaction server system 65 can route the interaction accordingly (step/operation 518 of FIG. 5B). Routing an interaction may refer to executing various actions. For example, routing an interaction to an interaction queue may include tagging the interaction with an interaction queue identifier or assigning the interaction to the interaction action queue. This may further include providing indicia of a position or priority for the interaction with regard to the tagged or assigned interaction queue. In another example, routing an interaction to an interaction flow may include connecting (e.g., transferring control of) the interaction with a live instance of an interaction flow or first instantiating a live instance of an interaction flow and then connecting (e.g., transferring control of) the interaction. Thus, "routing" an interaction is used broadly to encompass various embodiments and technological approaches for handling interactions. And as previously noted, an optimal route may indicate an interaction queue to which the interaction should be assigned, a position or priority in an interaction queue to which the interaction should be assigned, an interaction flow to which the interaction should be connected; and a node in an interaction flow to which the interaction should be connected, and/or the like.

In one embodiment, as part of routing the interaction, the interaction server system 65 can generate a presentation of the interaction problem statement summary or include the interaction problem statement summary for presentation to the live agent, for example. This allows the agent to understand the context of the interaction before, while, and/or after handling the interaction. The problem statement summary can be presented in a variety of ways—such as audible presented to a live agent or textual presented via an interface. As will be recognized, a variety of approaches and techniques can be used to adapt to various needs and circumstances.

i. Training and Updating Machine Learning Models

As previously described, the one or more machine learning models can be used to predict an optimal route for an interaction. This involves initially training the models and updating the models to maintain accuracy. For both training and updating, the machine learning models can build functions to translate interaction specifics into optimality scores as identified above. These optimality scores enable selection of the next transfer which produces the highest optimality score. Exemplary machine learning approaches and techniques include model predictive control, Naïve Bayes, linear discriminant analysis, regularized discriminant analysis, quadratic discriminant analysis, Gaussian mixture models and kernel density estimation, logistic regression, random forests, extreme gradient boosting, deep neural networks, genetic algorithms, particle swarm optimization, simulated annealing, reinforcement learning, grid search methods, and/or the like.

After initially training the one or more machine learning models, the interaction server system 65 can monitor, collect, and record completed or historical interaction information/data about each interaction (step/operation 520 of FIG. 5B). The completed or historical interaction information/data may include the assigned interaction queue (and position or priority), labeled interaction categories, labeled interaction subcategories, interaction problem statement summaries, user intent, the assigned interaction flow, the demographics of the agent who handled the interaction, the skills of the agent who handled the interaction, interaction keywords, the results of the interactions, follow-up interactions by the same user with similar problem statement summaries, follow-up interactions by the same user within a configurable time frame, the number of transfers of the interaction, the transfer origins and destinations, whether the transfers were soft transfers or hard transfers, the department or interaction queues that resolved the interactions, requested electronic feedback (e.g., survey responses) from interactions, target metrics (e.g., abandonment rate, total interaction time, authentication rate, and/or the like), and/or the like.

The interaction server system 65 can use the completed or historical information/data to initially build (e.g., train and validate) and update the machine learning models (step/operation 522 of FIG. 5B). As will be recognized, the updating may occur in real time or in batch—depending on whether the bias of recent or balanced skewing is desired. The updated machine learning models can then be used to predict optimal routes for subsequent interactions.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
receiving, by one or more processors and from a user computing device, an interaction problem statement that is input by a user via the user computing device during an interaction, wherein the interaction is at least one of a voice-based interaction with the user via the user computing device or a textual-based interaction with the user via the user computing device;

generating, by the one or more processors and based at least in part on the interaction problem statement, an interaction problem statement summary, wherein the interaction problem statement summary (a) is generated (i) using at least one of keyword extraction, machine learning, abstractive summarization, or natural language processing, and (ii) during the interaction, and (b) comprises a reason for the interaction;

identifying, by the one or more processors and based at least in part on the interaction problem statement summary, one or more features associated with the interaction;

generating, by the one or more processors and using one or more machine learning models, an optimal route prediction for the interaction, wherein (a) the one or more features are provided as input to the one or more machine learning models, and (b) the optimal route prediction is based at least in part on the one or more features;

routing, by the one or more processors, the interaction to an optimal route indicated by the optimal route prediction;

monitoring, by the one or more processors, (a) a result of the interaction and (b) one or more target metrics; and storing, by the one or more processors and in association with the interaction, (a) the result of the interaction and (b) the one or more target metrics.

2. The computer-implemented method of claim 1 further comprising retraining, based at least in part on (a) the result of the interaction and (b) the one or more target metrics, the one or more machine learning models.

3. The computer-implemented method of claim 1 further comprising:
requesting electronic feedback for the interaction; and
storing, in association with the interaction, the electronic feedback for the interaction.

4. The computer-imple mented method of claim 3 further comprising retraining, based at least in part on the electronic feedback, the one or more machine learning models.

5. The computer-imple mented method of claim 1, wherein the optimal route is at least one of an interaction queue, a position in an interaction queue, a priority in an interaction queue, an interaction flow; or a node in an interaction flow.

6. The computer-implemented method of claim 1 further comprising transcribing the interaction problem statement from audio form to textual form.

7. The computer-implemented method of claim 1, wherein the keyword extraction comprises at least one of rapid automatic keyword extraction or term frequency-inverse document frequency-based extraction.

8. A computer program product comprising a non-transitory computer readable medium having computer program instructions stored therein, the computer program instructions when executed by a processor, cause the processor to:
receive from a user computing device, an interaction problem statement that is input by a user via the user computing device during an interaction, wherein the interaction is at least one of a voice-based interaction with the user via the user computing device or a textual-based interaction with the user via the user computing device;
generate, based at least in part on the interaction problem statement, an interaction problem statement summary, wherein the interaction problem statement summary (a) is generated (i) using at least one of keyword extraction, machine learning, abstractive summarization, or natural language processing, and (ii) during the interaction, and (b) comprises a reason for the interaction;
identify based at least in part on the interaction problem statement summary, one or more features associated with the interaction; generate, using one or more machine learning models, an optimal route prediction for the interaction, wherein (a) the one or more features are provided as input to the one or more machine learning models, and (b) the optimal route prediction is based at least in part on the one or more features;
route the interaction to an optimal route indicated by the optimal route prediction;
monitor (a) a result of the interaction and (b) one or more target metrics; and
store, in association with the interaction, (a) the result of the interaction and (b) the one or more target metrics.

9. The computer program product of claim 8, wherein the computer program instructions when executed by a processor, further cause the processor to retrain, based at least in part on (a) the result of the interaction and (b) the one or more target metrics, the one or more machine learning models.

10. The computer program product of claim 8, wherein the computer program instructions when executed by a processor, further cause the processor to:
request electronic feedback for the interaction; and
store, in association with the interaction, the electronic feedback for the interaction.

11. The computer program product of claim 10, wherein the computer program instructions when executed by a processor, further cause the processor to retrain, based at least in part on the electronic feedback, the one or more machine learning models.

12. The computer program product of claim 8, wherein the optimal route is at least one of an interaction queue, a position in an interaction queue, a priority in an interaction queue, an interaction flow; or a node in an interaction flow.

13. The computer program product of claim 8, wherein the computer program instructions when executed by a processor, further cause the processor to transcribe the interaction problem statement from audio form to textual form.

14. The computer program product of claim 8, wherein the keyword extraction comprises at least one of rapid automatic keyword extraction or term frequency-inverse document frequency-based extraction.

15. A computing system comprising a non-transitory computer readable storage medium and one or more processors, the computing system configured to:
receive from a user computing device, an interaction problem statement that is input by a user via the user computing device during an interaction, wherein the interaction is at least one of a voice-based interaction with the user via the user computing device or a textual-based interaction with the user via the user computing device;
generate, based at least in part on the interaction problem statement, an interaction problem statement summary, wherein the interaction problem statement summary (a) is generated (i) using at least one of keyword extraction, machine learning, abstractive summarization, or natural language processing, and (ii) during the interaction, and (b) comprises a reason for the interaction;

identify based at least in part on the interaction problem statement summary, one or more features associated with the interaction;

generate, using one or more machine learning models, an optimal route prediction for the interaction, wherein (a) the one or more features are provided as input to the one or more machine learning models, and (b) the optimal route prediction is based at least in part on the one or more features;

route the interaction to an optimal route indicated by the optimal route prediction;

monitor (a) a result of the interaction and (b) one or more target metrics; and store, in association with the interaction, (a) the result of the interaction and (b) the one or more target metrics.

16. The computing system of claim 15, wherein the computing system is further configured to retrain, based at least in part on (a) the result of the interaction and (b) the one or more target metrics, the one or more machine learning models.

17. The computing system of claim 15, wherein the computing system is further configured to:

request electronic feedback for the interaction; and store, in association with the interaction, the electronic feedback for the interaction.

18. The computing system of claim 17, wherein the computing system is further configured to retrain, based at least in part on the electronic feedback, the one or more machine learning models.

19. The computing system of claim 15, wherein the optimal route is at least one of an interaction queue, a position in an interaction queue, a priority in an interaction queue, an interaction flow; or a node in an interaction flow.

20. The computing system of claim 15, wherein the computing system is further configured to transcribe the interaction problem statement from audio form to textual form.

21. The computing system of claim 15, wherein the keyword extraction comprises at least one of rapid automatic keyword extraction or term frequency-inverse document frequency-based extraction.

* * * * *

UNITED STATES PATENT AND TRADEMARK OFFICE
CERTIFICATE OF CORRECTION

| | |
|---|---|
| PATENT NO. | : 11,769,038 B2 |
| APPLICATION NO. | : 16/382343 |
| DATED | : September 26, 2023 |
| INVENTOR(S) | : Jesse Hultgren et al. |

It is certified that error appears in the above-identified patent and that said Letters Patent is hereby corrected as shown below:

In the Claims

In Column 19, Line 39, Claim 4, delete "computer-imple mented" and insert -- computer-implemented --, therefor.

In Column 19, Line 42, Claim 5, delete "computer-imple mented" and insert -- computer-implemented --, therefor.

Signed and Sealed this
Nineteenth Day of December, 2023

Katherine Kelly Vidal
*Director of the United States Patent and Trademark Office*